United States Patent [19]
Burger et al.

[11] Patent Number: 4,618,467
[45] Date of Patent: Oct. 21, 1986

[54] METHOD FOR SEALING CAVITIES

[75] Inventors: Hans-Joachim Burger, Kummersbruck; Hubert Schuster, Oberleinsiedl, both of Fed. Rep. of Germany

[73] Assignee: Siemens Aktiengesellschaft, Munich and Berlin, Fed. Rep. of Germany

[21] Appl. No.: 676,181

[22] Filed: Nov. 29, 1984

[30] Foreign Application Priority Data

Dec. 1, 1983 [DE] Fed. Rep. of Germany ....... 3343534

[51] Int. Cl.⁴ .................. B29C 39/10; B29C 67/22; C08G 18/14
[52] U.S. Cl. ............................ 264/46.6; 264/46.5; 264/46.7; 264/271.1; 264/272.14; 264/338
[58] Field of Search .............. 264/46.4, 46.5, 46.6, 264/46.7, 271.1, 272.14, 338

[56] References Cited

U.S. PATENT DOCUMENTS

| 621,978 | 4/1949 | Rado . | |
|---|---|---|---|
| 970,067 | 9/1964 | Emsig . | |
| 2,489,176 | 5/1982 | Barland . | |
| 2,722,962 | 11/1955 | Hampshire | 154/1 |
| 2,944,170 | 7/1960 | Knapp et al. | 264/46.5 X |
| 3,075,249 | 1/1963 | Sucher | 264/255 |
| 3,493,449 | 2/1970 | Krug | 264/46.4 X |
| 3,838,316 | 9/1974 | Brown et al. | 264/272 |
| 3,844,523 | 10/1974 | Wilheim | 264/45.5 X |
| 4,130,614 | 12/1978 | Saidla | 264/45.3 X |
| 4,264,544 | 4/1981 | Wilheim | 264/45.5 |

FOREIGN PATENT DOCUMENTS

| 2489176 | 9/1980 | France . |
| 299458 | 8/1954 | Switzerland . |
| 621978 | 4/1949 | United Kingdom . |
| 970067 | 9/1964 | United Kingdom . |

OTHER PUBLICATIONS

Reichhold (RCI) Application Bulletin, "Polyite Polyurethane Resin: Production & Trouble Shooting Guide for Molded Rigid Polyurethane Foam Furniture Components", White Plains, N.Y., Reichhold Chemicals, Inc. (1/70), 8 pages.

Primary Examiner—Philip Anderson
Attorney, Agent, or Firm—J. L. James; F. W. Powers

[57] ABSTRACT

A method of sealing cavities open on one side, preferably cavities of electrical equipment housings fitted with various components. A measured quantity of an encapsulant, preferably polyurethane foam, is inserted into the cavity. Thereafter the opening is covered by a permeable, absorbent fabric, preferably of polypropylene, which is covered first by an elastic and then a rigid layer. After hardening, the fabric is removed from the surface of the encapsulant.

18 Claims, 2 Drawing Figures

METHOD FOR SEALING CAVITIES

BACKGROUND OF THE INVENTION

This invention relates to a method for sealing cavities with one open side, preferably cavities in which electrical or electronic components are disposed. In devices manufactured using previously known procedures, for example as shown in U.S. Pat. No. 3,838,316, the surface of the sealant or encapsulant exhibits and irregular structure due to enclosed air bubbles or to external environmental factors. These irregularities are reflected in an irregular or pitted encapsulant surface.

It is known that the surface of compression-molded parts can be shaped by mounting fabrics in or on the face of a die, in order to impress the texture of the fabric into the surface of the molded part. However, a method of reliably producing a smooth, flat surface for a cavity-filling encapsulant has so far eluded those skilled in the art. It will therefore be appreciated that it would be highly desirable to provide a method for producing a smooth, flat surface on a volume of ecapsulant disposed in a cavity.

It is therefore an object of the invention to provide the surface of a volume of encapsulant with a smooth, flat surface.

It is another object of the invention to inexpensively produce a smooth surface upon a sealed cavity.

SUMMARY OF THE INVENTION

Briefly stated, in accordance with one aspect of the invention the foregoing objects are achieved by having a measured quantity of sealant inserted in a cavity, then placing a permeable absorbent fabric over the cavity. The fabric is then removed after the sealant hardens. It is thereby possible to perform repairs on the device whereby, following subsequent sealing, the original surface structure can for all intents and purposes be reestablished. In order to avoid any arching or other unevenness on the encapsulant's outer surface, it is a further advantage if succeeding resilient and rigid layers are applied on top of the absorbent fabric, which after the sealant hardens are removed together with the absorbent fabric.

BRIEF DESCRIPTION OF THE DRAWING

While the specification concludes with claims particularly pointing out and distinctly claiming the subject matter which is regarded as th invention, it is believed that the invention will be better understood from the following description of the preferred embodiment taken in conjunction with the accompanying drawings in which:

DESCRIPTION OF A PREFERRED EMBODIMENT

Figure 1:
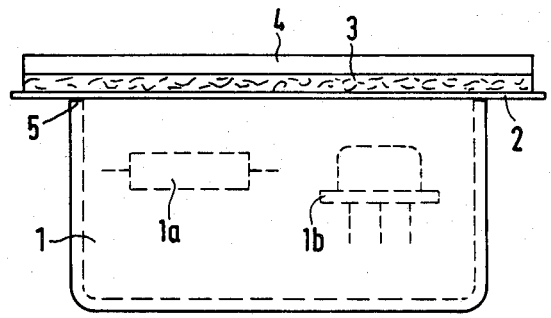
FIG. 1 illustrates apparatus for practicing the present invention.

FIG. 1 shows the housing 1 of an electrical switching device, for instance, a solid-state oscillator including components depicted in idealized form at 1a and 1b. Fabric 2 extends across the open side of the housing, and is covered by an elastic layer 3 and a rigid layer 4. The elastic layer may comprise either silicone rubber or foam rubber, and the rigid layer may advantageously be an iron plate.

Figure 2:
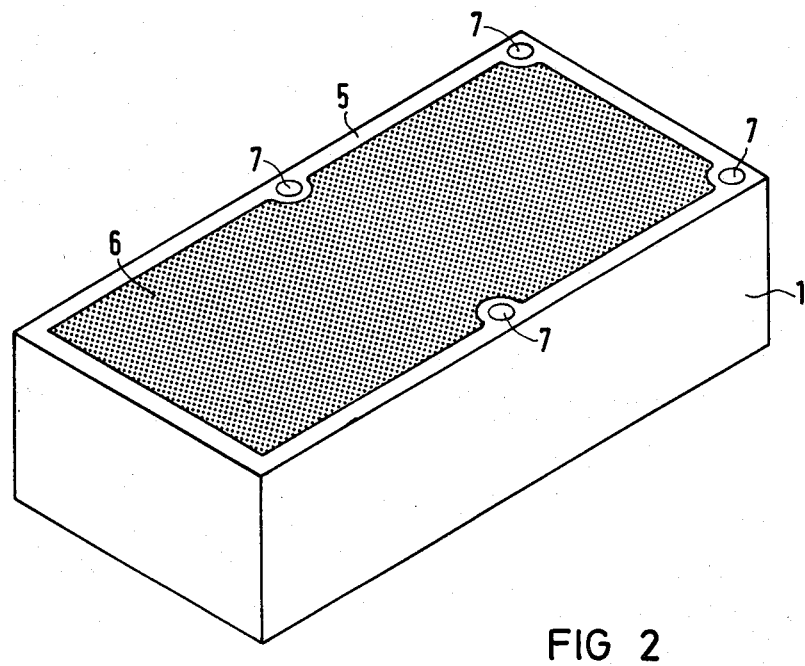
FIG. 2 is an oblique depiction of an encapsulated device.

After the components 1a, 1b are inserted in housing 1, a measured quantity of an encapsulant, e.g., polyurethane foam, is placed into the housing. The fabric 2 is then extended across the side walls 5 of housing 1 and weighed down by layers 3 and 4. As the polyurethane foam hardens, the fabric 2 is moistened and trapped air can escape through the fabric. After the encapsulant hardens, the layers 3 and 4 are removed and fabric 2 pulled off the encapsulant surface 6, thereby leaving a pattern on the encapsulant surface 6 as seen in FIG. 2. The side walls 5 and fastening holes 7 remain free of the encapsulant. When selecting the encapsulant and the absorbent fabric, one must ensure that the fabric will not bond chemically with the encapsulant so that it can be removed while leaving a surface pattern matching the fabric. While casting resins have proven to be advantageous encapsulants. Polyurethane foams are particularly advantageous when used in conjunction with a fabric of polypropylene as they provide for a very good separation between the fabric and the encapusulant. The appearance of the finished encapsulant surface 6 is similar, for example, to a linen pattern, which generally enhances the visual appearance of the device.

It will now be understood that there has been disclosed an improved method for producing a substantially flat, void-free surface on an encapsulant-filled cavity in an economical manner.

As will be evident from the foregoing description certain aspects of the invention are not limited to the particular details of the examples illustrated, and it is therefore contemplated that other modifications or applications will occur to those skilled in the art.

What is claimed as new and desired to be secured by Letters Patent of the United States is:

1. A method for sealing cavities having one open side and adapted to receive electrical or electronic components therein, comprising the steps of:
   disposing a measured quantity of encapsulant into the cavity:
   placing a layer of a releasable permeable absorbent synthetic resin fabric across said open side and overlapping the edge thereof:
   allowing the encapsulant to harden against said fabric; and removing said fabric.

2. The method according to claim 1, further including the steps of placing a layer of elastic material over said fabric; and thereafter placing a layer of rigid material over said elastic layer.

3. The method according to claim 1, in which said encapsulant comprises polyurethane foam.

4. The method according to claim 1, in which said encapsulant comprises a casting resin.

5. The method according to claim 1, wherein said fabric is formed of polypropylene.

6. The method according to claim 2, in which said encapsulant comprises polyurethane foam.

7. The method according to claim 2, in which said encapsulant comprises a casting resin.

8. The method according to claim 2, wherein said fabric is formed of polypropylene.

9. A method for sealing cavities having one open side and electrical or electronic components mounted therein, comprising the steps of:
   disposing a measured quantity of polyurethane foam into the cavity;

placing a layer of a releasable permeable absorbent synthetic resin fabric across said open side and overlapping the edge thereof;

allowing the polyurethane foam to harden against said fabric; and removing said fabric.

10. The method according to claim 9, wherein removing said fabric leaves a pattern on the surface of the polyurethane foam.

11. The method according to claim 9, wherein said fabric is formed of polypropylene.

12. The method according to claim 9, further including the steps of placing a layer of elastic material over said fabric; and thereafter placing a layer of rigid material over said elastic layer.

13. The method according to claim 12, wherein said fabric is formed of polypropylene.

14. A method for sealing cavities having one open side and electrical or electronic components mounted therein, comprising the steps of:

disposing a measured quantity of epoxy resin into the cavity;

placing a layer of a releasable permeable absorbent synthetic resin fabric across said open side and overlapping the edge thereof;

allowing the epoxy resin to harden against said fabric; and removing said fabric.

15. The method according to claim 14, wherein removing said fabric leaves a pattern on the surface of the epoxy resin.

16. The method according to claim 14, wherein said fabric is formed of polypropylene.

17. The method according to claim 14, further including the steps of placing a layer of elastic material over said fabric; and thereafter placing a layer of rigid material over said elastic layer.

18. The method according to claim 17, wherein said fabric is formed of polypropylene.

* * * * *